United States Patent [19]
Pleva

[11] Patent Number: 5,253,852
[45] Date of Patent: Oct. 19, 1993

[54] SPRING USED WITH COMPLEMENTARY SPACER

[75] Inventor: Walter F. Pleva, Indiatlantic, Fla.

[73] Assignee: Uniform Loading Spring Corporation, Clearwater, Fla.

[21] Appl. No.: 790,799

[22] Filed: Nov. 12, 1991

Related U.S. Application Data

[63] Continuation-in-part of Ser. No. 197,321, May 23, 1988, Pat. No. 5,072,917, which is a continuation of Ser. No. 52,066, May 21, 1987, abandoned.

[51] Int. Cl.$^5$ .................................. F16F 3/02
[52] U.S. Cl. ............................. 267/162; 411/162
[58] Field of Search ....................... 411/161, 162; 267/158-162

[56] References Cited

U.S. PATENT DOCUMENTS

| | | | |
|---|---|---|---|
| 1,034,721 | 11/1912 | Prince | 411/162 |
| 2,069,402 | 2/1937 | Cowlin | 411/162 |
| 2,179,575 | 11/1939 | Hosking | 411/162 |
| 2,744,773 | 5/1956 | Cliborn | 267/161 |
| 3,884,457 | 5/1975 | Leko | 267/162 |
| 4,043,546 | 8/1977 | Ashfield et al. | 267/162 |

FOREIGN PATENT DOCUMENTS

| | | | |
|---|---|---|---|
| 805954 | 7/1949 | Fed. Rep. of Germany | 267/162 |
| 55-76231 | 6/1980 | Japan | 267/162 |

*Primary Examiner*—Matthew C. Graham

[57] ABSTRACT

A generally flat, flexible, resilient, double faced spring used in combination with a generally flat spacer with the spring having the same number of uniform protrusions on each of its flat surfaces, the protrusions on each surface being equidistant from each other. The protrusions have spherical tips which function as multiple fulcrums, a spherical tip protrusion on one side of the spring surface being precisely halfway between the spherical protrusion on the other surface such that no protrusion on one surface is exactly opposite a protrusion on the other. The essentially flat spacer is equipped with protrusion receiving recesses spaced to coincide with the locations of the protrusion on the adjacent spring. The tip of each protrusion of a spring is in alignment with a respective spacer recess so that when multi-protrusion springs are combined with a spacer, they are prevented by the recesses from laterally shifing or moving into a rotational position.

3 Claims, 2 Drawing Sheets

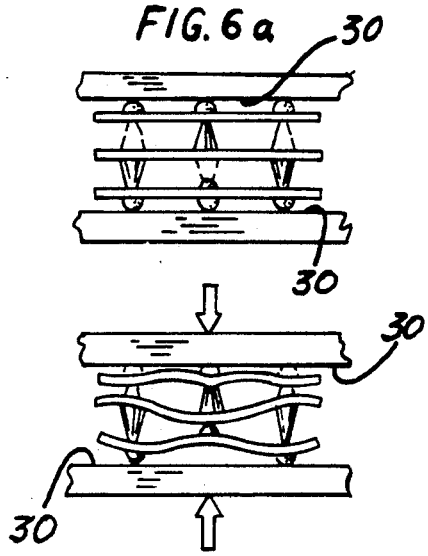
FIG. 6a
FIG. 6b
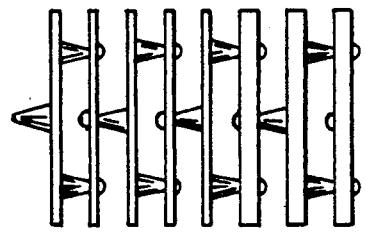
FIG. 7
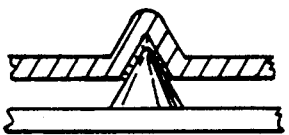
FIG. 10
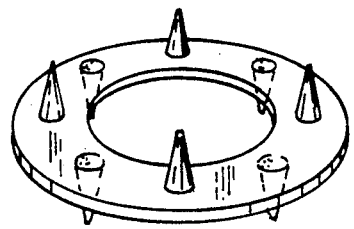
FIG. 8
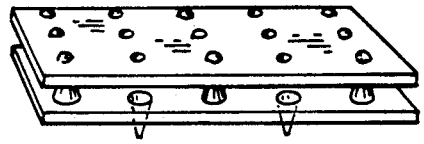
FIG. 11
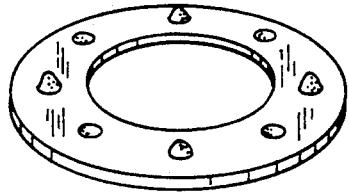
FIG. 9
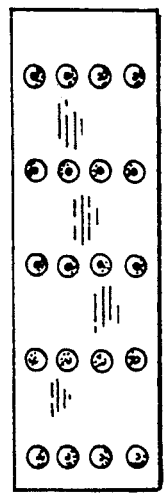
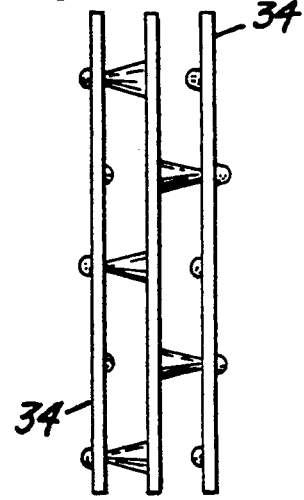
FIG. 12

SPRING USED WITH COMPLEMENTARY SPACER

CROSS-REFERENCE TO RELATED APPLICATION

This invention is a continuation-in-part of an earlier patent application Ser. No. 197,321 filed May 23, 1988, entitled "Uniform Loading Springs of Improved Configuration" now U.S. Pat. No. 5,072,917 filed May 21, 1987 which is a continuation of Ser. No. 07/052,066 now abandoned.

BACKGROUND OF THE INVENTION

This invention related to uniform loading springs traditionally included in a category of springs described generally as leaf springs, diaphragm springs, suspension springs or the like that form a cushioning or load bearing function. The springs of this invention may be employed in a wide variety of systems and can replace existing washers and springs such as wavy spring washers, curved spring washers, compression springs, and precision washers as well as lockwashers and the springs noted above. The springs comprising the present invention are controlled by simple beam deflection.

Prior art devices bearing some similarity to the present invention are reflected in, for example, U.S. Pat. No. 2,179,575 to Hosking, entitled "Lock Washer." This patent describes a device having a plurality of projections or locking elements which project from opposite sides of the washer body. In such a structure, these projections may include corners or edges that define sharp work-engaging corners or edges that can embed themselves within the surface of the work piece; i.e. a screw head or nut. Thus, Hosking encourages the lock washer to engage the adjacent member—the underside of a screw head or a nut—in a scraping or scarring manner, so as "to effectively secure the nut against retrograde movement."

Consequently, an object of this invention is to provide springs which have great versatility; uniform spring loading, compression, and flexibility under variable environmental conditions; and no damage to adjacent members. The springs of the present invention are designed to minimize friction, overheating, shear, stress, fatigue, deformation, noise levels, oscillations, and vibrations. Another object is to reduce weight and bulk and enhance load capacity as compared to existing springs employed for comparable jobs.

Existing lockwashers are typically loaded at one or sometimes several points. This causes shearing, scarring or other damage to the screw or base of the metal. However, if washers are used on both sides of the ordinary lockwasher, there is a tendency to loosen under vibration. Thus, another object of this invention is to prevent such spring loosening because of spring tension while avoiding metal fracture, scarring and chipping.

Many spring systems and designs have failed because of lack of uniform loading and maintenance of alignment in many areas (bearings and optical precision instruments, for example) due to temperature changes, stress, humidity, atmospheric pressure and other environmental factors that may cause critical variations. In bearing designs, proper alignment and adjustment of the ball track is very important to prevent skidding and noise and to increase bearing life. In optical and other precision instruments (such as those employed in outerspace), maintaining uniform loading, providing for expansion and contraction, reducing stress, preventing deformation, and damping of vibrations or oscillations are vital to proper and successful performance.

Presently available wavy washers cannot be fabricated for sensitive uniform loading because of their configuration. The wavy portion on each contact segment is not equal and has a different spring rate. Twisting taking place on each contact segment causes undue stress which does not permit the material to return to its original position. This results from structural fatigue. Belleville spring washers have similar problems because of buckling. Deformation or fracture of the spring can destroy the entire system in which it is employed.

It was to overcome these and other disadvantages of the prior art that the present invention was developed.

SUMMARY OF THE INVENTION

A spring designed in accordance with this invention may comprise a generally flat, flexible, resilient, double-surfaced spring component used with a generally flat spacer member. The same number of uniform protrusions are utilized on each surface of each spring component, with each adjacent pair of protrusions being equidistant from each other. The bases of these protrusions are firmly attached to the respective surface of the spring component. The protrusions have spherical tips which are usable as multiple fulcrums. A given spherical tip protrusion on one side or surface of the spring is precisely half-way between the spherical protrusions on the other surface, such that no protrusion on one surface is exactly opposite a protrusion on the other surface.

Although the primary configuration of the novel spring of this invention involves the use of one multiprotrusion spring in contact with an essentially flat spacer member equipped with protrusion-receiving recesses, a variation can use a multiprotrusion spring, each side of which engages a spacer member equipped with multiple recesses. The essentially flat spacer member is equipped with recesses spaced to coincide with the locations of the protrusions on the adjacent spring component.

The tip of each protrusion of a spring is in alignment with a respective recess provided in the adjacent essentially flat spacer member. Thus, when a number of multiprotrusion springs are combined, they are prevented by the recesses on the flat member from laterally shifting or moving into a rotational position where the protrusions of one spring are in the undesirable alignment with the protrusions of the other spring.

One basic embodiment of the spring is of annular configuration, having a central hole into which components associated with the adjacent members may extend.

Another distinct embodiment of the invention involves a spring in which the flat, flexible, resilient, double-surfaced material is of rectangular, square, or other configuration, in which no central hole is utilized.

In accordance with either of these principal embodiments, sandwich construction may be utilized using a number of annularly shaped members or a number of rectangularly shaped members in a stacked relationship.

In either type of sandwich construction, there is a substantially flat spacer to separate the springs which utilizes recesses to receive the spherical points of the mounting protrusions to prevent the protrusions of one spring from moving into an undesirable relationship with another spring.

As to the protrusions utilized, they may be hollow, generally spherically formed contact points, each usable as a fulcrum with protrusions alternating on each surface of each spring. Alternatively, the protrusions may be solid and generally spherically configures or rounded so as to be usable as fulcrum contact points, with the surface of the spring opposite each protrusion being flat.

The springs basically consist of double-surfaced flat spring (metal disks or the like) having uniform projections or protrusions on both sides. These projections or protrusions alternate with generally flat areas and must be centered and equally spaced so that a rounded protrusion on one side or surface of the spring is precisely centered opposite a flat area on the other side or surface of the spring. Therefore, the rounded protrusions are equally spaced from one another on each side of the spring and uniformly spaced from the edge of the spring base.

The number of protrusions on each side of the spring should be equal and of the same size and configuration. There may be one or more rows of protrusions.

Uniform loading is achieved by the structure and symmetry of the spring. For most uses, the preferred structure has a minimum of three rounded or generally spherical protrusions on each side of the spring. However, two protrusions on each side may be quite satisfactory in some circumstances. It is also obvious that more than three protrusions may be used on each side of the spring.

Where the protrusions on the springs are formed by a press which forms a dent in one surface and a protrusion on the opposite surface, dents and protrusions alternate on each surface. In the case of a circular spring, the dents and protrusions are placed on the circumference of a circle which is coaxial with the circumference of the spring. The spring would usually be annular with a center aperture as shown in the appended drawings.

The advantage of utilizing these uniformly spaced, rounded protrusions can best be understood by describing the operation of the spring. When a spring is placed between two adjacent members (essentially flat spacers) each protrusion on one side of the spring will contact the first spacer, and each protrusion on the other side of the spring will contact the second spacer. Where all protrusions are of the same size, the tops of the rounded protrusions on one side are in a place which is parallel to the plane determined by the tops of the rounded protrusions on the other spring side. The spacers are equipped with recesses to receive the spherical tips of the respective protrusions.

When the contacting elements of adjacent members are barely touching the protrusions, the spring is unstressed. When the device in which the springs are used is assembled, the connection between the contacting elements and the spring is normally tightened so that the spring is under some stress. When this occurs, the spring bends between the protrusions like a beam of resilient material. Thus, the elements are held firmly in place by the preloading stress. Even when compressed, the spring should float and not contact the housing, except in instances where there may be only two protrusions on each side and the spring is used in the general manner of a tension spring. In such a case, there is no damage to adjacent members by the locking action.

If the device under stress is moved to a different environment involving changes in atmospheric pressure or changes in temperature or humidity which causes expansion or contraction of any elements of the device, the consequent expansion or contraction will either increase or decrease the flexure of the spring accordingly. A tight fit and the parallelism of the elements will be maintained.

The compensatory effect of the springs can be made with extreme changes in atmospheric conditions. For example, a camera sent from earth to outer space may encounter a variety of extreme conditions. The springs can compensate for the changes between dissimilar elements such as glass and metal or different metals. No known prior art spring can provide such uniform compensation.

The springs of the present invention may be fabricated in any size or configuration. Depending upon the use, springs may be circular, oblong, oval, rectangular, and the like. The protrusions may be rounded or generally spherical, so as to act as non-damaging fulcrums in conjunction with the basic flat member of the device. The protrusions or fulcrums can be manufactured as solid or hollow forms.

The springs may be manufactured by various inexpensive means and fabricated of various metals, such as spring or stainless steels, exotic metals or materials or combinations thereof, or polymeric or synthetic materials as needed depending upon the conditions and purposes. The materials should have spring memory and not plastic deformation. Specifically, the spring materials need resilient qualities. Load may be varied by using different type, weight, thickness or stiffness of materials.

The entire spring with its rounded protrusions may be case in molds, or projections may be made and then riveted, brazed, welded, or otherwise affixed to both spring surfaces. Another means of forming protrusions is to stamp the spring material with a die or predetermined size and configuration to form a hollow, carefully rounded member, with a dent on the side opposite. Rounded, generally spherical protrusions are then formed on both sides of the spring in such a manner that they alternate with dents of equidistant intervals.

The springs of this invention may be nested or ganged to produce combinations of springs, springs and washers, or spacers. Such multiple combinations provide accurate loading with less sensitivity to load change due to expansion or contraction responding to environmental forces. These combinations can be used in power packs, spring drives, dynamic oscillators, differential springs, and the like. They can change frequency and resonance in vibration systems. Also, they may be employed in bimetallic compensation networks, shock absorbers, and friction clutches.

As the springs become larger in diameter, additional fulcrums may be included which will permit handling greater loads with thinner spring material. This is directly contrary to the action arising from the use of a coil spring where increasing the coil diameter reduces the strength of the spring. In the rectangular embodiment of the present invention, increasing the long side or length of the spring increases the load it can bear.

As will now be clear, a principal object of this invention is to provide multiprotrusion springs used with complimentary spacers. There are made at reasonable cost, have great versatility, and provide uniform spring loading, compression and flexibility under variable environmental conditions.

The springs are designed to minimize friction and overheating, shear, stress, fatigue, deformation, noise levels, oscillations, and vibrations.

Another objective is to reduce weight and bulk and enhance load capacity compared to existing springs employed for comparable jobs.

Another object of this invention is to provide springs designable to sensitive configuration and therefore respondable to the precise load requirements of design engineers.

Still another object of this invention is to maintain alignment of parts of precision instruments under variable conditions.

Yet still another further object of the invention is to reduce the cost of manufacturing prevision instruments. By employing springs of the invention in such instruments, tedious refinements and adjustments may be obviated by the action of the springs in correcting machining error. The uniform loading of the spring can take up the tolerance error by providing more uniform compensation for machining inaccuracies. Ball bearings, for example, slightly out of square to a machine face, may be adjusted with the springs of this invention.

These and other objects, features and advantages of the present invention will be made more apparent from a consideration of the following detailed description taken in conjunction with the following drawings.

BRIEF DESCRIPTION OF THE DRAWINGS

FIG. 6a is a side elevational and functional view of a spring and comprising an embodiment of the present invention positioned against two engaging surfaces in an unloaded condition.

FIG. 6b is a side elevational and functional view of the spring and two washers comprising an embodiment of the present invention positioned against two engaging surfaces in a loaded or flexed condition.

FIG. 7 is a side elevational and schematic view showing the use of springs and washers of varying thickness to control dampening functions required in the system used.

FIG. 8 is a perspective view of a spring and washer forming an embodiment of the present invention with the elements separated to illustrate greater detail of these components.

FIG. 9 is a plan view of a ten (10) fulcrum spring or spacer.

FIG. 10 is an enlarged, sectional and fragmentary view of the welding, bonding, fusing or otherwise connecting of a protrusion with a recess as used in the present invention.

FIG. 11 is a perspective view of a rectangular spring and two rectangular spacers forming another embodiment of the present invention.

FIG. 12 is a plan and side elevational view of the embodiment of the present invention shown in FIG. 11.

DETAILED DESCRIPTION OF THE PREFERRED EMBODIMENT

Figure 1:
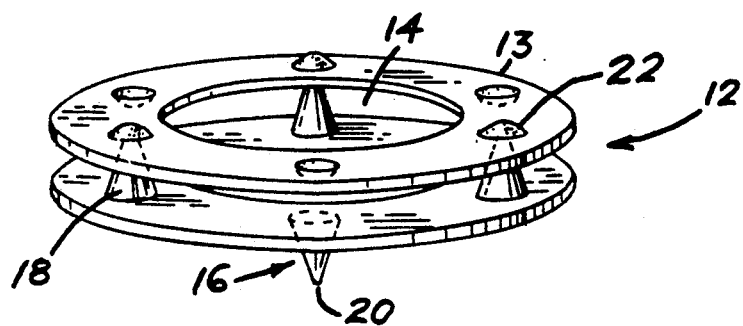
FIG. 1 is a perspective view illustrating one of the multiprotrusion springs disposed adjacent an essentially flat spacer, which spacer is equipped with recesses placed to receive the protrusions of the spring.

Referring to FIG. 1, a uniform loading spring shown generally as 12 is utilizable in compression with an adjacent spacer 13, spring 12 being a substantially flat double surfaced component of flexible material having a centrally positioned hole 14. At least two symmetrically shaped protrusions, shown generally as 16, are mounted on each surface of spring 12, with the protrusions on one surface being precisely half-way between the protrusions on the other surface of spring 12. The protrusions 16 are circularly positioned and have a common radius.

Each of the protrusions 16 is conically configured, has a base portion 18 that is affixed to one side of spring 12, and has a spherically configured tip 20 that is remote from base portion 18. Additional details of spring 12 and the protrusions 16 are shown in FIGS. 2 and 3.

With continuing reference to FIG. 1, it will be seen that spacer 13 is approximately the same size and of the same general configuration as spring 12. Spacer 13 is provided with a number of recesses 22, the recess spacing being identical to the protrusion spacing on spring 12.

When spring 12 and spacer 13 are properly aligned, the spherical configured tips 20 of protrusions 16 are received in recesses 22. This alignment between protrusions 16 and recesses 22 prevents displacement of one component with respect to the other.

Figure 2:
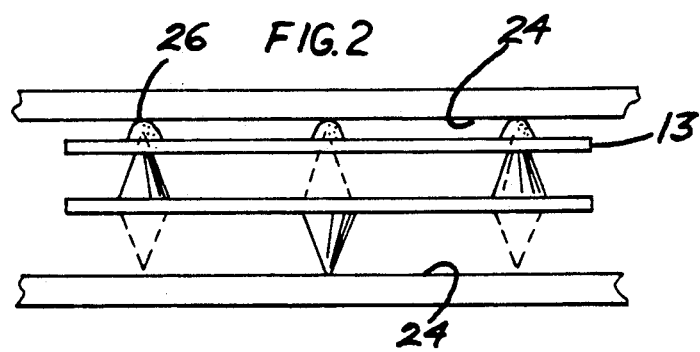
FIG. 2 is an end-elevational view of the spring and spacer shown in FIG. 1 assembled in an operational relationship and depicted in a no-load condition.
Figure 4:
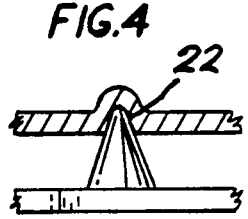
FIG. 4 is a partial, sectional view illustrating a typical protrusion on one spring engaging the corresponding recess on the adjacent spacer.
Figure 3:
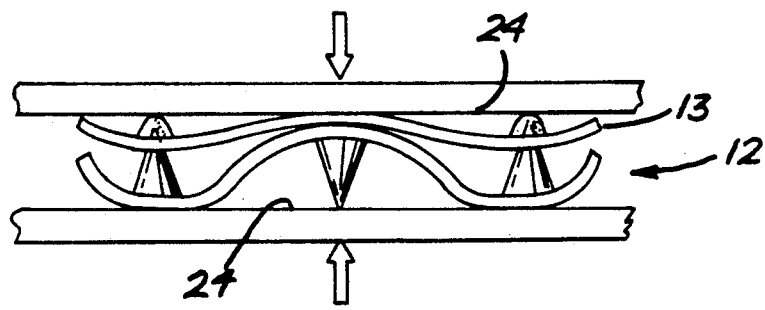
FIG. 3 is an end-elevational view of the spring and spacer shown in FIG. 2 depicted in a deflected or loaded condition.

FIG. 2 illustrates the positioning of a spring 12 and spacer 13 in proper alignment between two movable surfaces 24 without experiencing any compression between these two surfaces. The tips 20 of protrusions 16 directly engage one surface 24, and the larger protrusions 26 forming the opposite side of the recesses 22 engage the other movable surface 24.

FIG. 3 illustrates a compressive action exerted by surfaces 24 (see arrows) sufficiently strong that the spring is under stress and therefore bends between protrusions 16 like a beam of resilient material. Spring 13 is also under stress and deflects significantly less but in a similar pattern.

Figure 5:
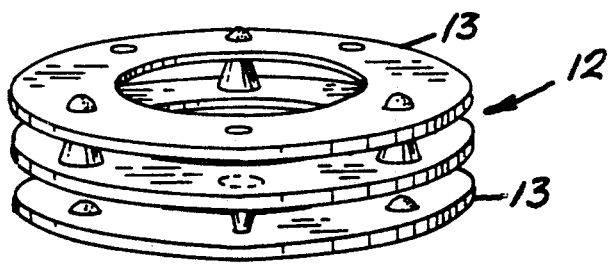
FIG. 5 is a perspective view illustrating a multi-protrusion spring disposed between a pair of flat spacers, which spacers are equipped with recesses placed to receive the protrusions of the spring.

FIG. 5 illustrates the use of two spacers on either side of spring 12 wherein the protrusion tips 20 are nested within recesses 22. This fixed arrangement is also shown in FIG. 6b, particularly that part of the view which illustrates the spring/spacer combination in an unloaded condition.

The result of applying force to the single spring double spacer combination is also shown in FIG. 6b where load is applied to the spacer engaging surfaces 30 causing the upper spacer and spring to deflect in a generally similar manner and the lower spacer to deflect in an essentially opposite manner. The use of spacers and springs of varying thickness are shown in FIG. 7, the varying combinations providing the capability to control demanding dampening functions in any particular system used. By combining the appropriate thicknesses of springs and spacers, precise dampening can be measured and applied.

FIG. 10 shown a rectangularly shaped spring embodying the present inventive concept wherein a flat spring 32 and two rectangular spacers 34 are shown in a spring/spacer/spring combination similar to the circular configuration of FIG. 5, 6a, 6b, and 8.

While a preferred embodiment of a spring using at least one complimentary spacer has been described, it is to be understood that modifications may be made in the spring and spacer sizes, configurations and numbers without departing from the spirit and purpose of the invention.

With respect to the preceeding description, it is to be realized that the optimum dimensional relationships for the parts of the invention to include variations in size, materials, shape, form, function and manner of operation, assembly and use, are deemed readily and obvious to one skilled in the art, and all equivalent relationships to those illustrated in the drawings and described in the specification are intended to be encompassed herein. Accordingly the foregoing is considered as illustrative only of the principles of the invention. Since numerous modifications and changes will readily occur to those skilled in the art, it is not desired to limit the invention to the exact construction and operation shown and described. All suitable modifications and equivalents that fall within the scope of the appended claims are deemed within the present inventive concept.

What is claimed as being new and what is desired to be protected by Letters Patent of the United States is as follows:

1. A uniform loading spring utilized in compression in combination with at least one adjacent spacer, the spring being substantially flat, of a flexible material and having a top surface and a bottom surface, each surface having a plurality of symmetrically shaped protrusions mounted thereon, each of the protrusions having a base portion and a spherically configured tip portion remote from the base portion, the at least one adjacent spacer having a top surface and a bottom surface, each surface having a number of tip portion receiving recesses pre-formed therein, the spacing of the spacer recesses on the spacer bottom surface being identical to the spacing of the tip portions of the spring protrusions on the spring top surface, such that when the spring and the spacer have been moved into a contiguous relationship the spherical tip portions of the spring protrusions of the spring top surface are precisely and fitably received in the pre-formed tip portion receiving recesses of the spacer bottom surface to prevent rotation of the spacer with respect to the spring during utilization of the spring.

2. The uniform loading spring as claimed in claim 1 wherein and additional spacer having a top and bottom surface, each surface having a number of tip portion receiving recesses pre-formed therein is combined with the spring so that the spherical tip portions of the spring bottom surface are precisely and fitably received in the pre-formed tip portion receiving recesses of the spacer top surface.

3. The uniform loading spring as claimed in claim 1 wherein additional pre-determined combinations of spring and spacers are operably joined to utilize in compression loads of selected sizes.

* * * * *